US011704458B2

(12) United States Patent
Karadimitriou et al.

(10) Patent No.: US 11,704,458 B2
(45) Date of Patent: Jul. 18, 2023

(54) SYSTEM AND METHOD FOR OPTIMIZING UTILITY PIPE SENSORS PLACEMENT USING ARTIFICIAL INTELLIGENCE TECHNOLOGY

(71) Applicant: Voda, Inc., Boston, MA (US)

(72) Inventors: Kosmas Karadimitriou, Shrewsbury, MA (US); Yun Yue, Concord, MA (US); George Demosthenous, Milton, MA (US); James C. Fitchett, Andover, MA (US)

(73) Assignee: Voda, Inc., Boston, MA (US)

( * ) Notice: Subject to any disclaimer, the term of this patent is extended or adjusted under 35 U.S.C. 154(b) by 448 days.

(21) Appl. No.: 17/069,537

(22) Filed: Oct. 13, 2020

(65) Prior Publication Data

US 2021/0110090 A1    Apr. 15, 2021

Related U.S. Application Data

(60) Provisional application No. 62/913,671, filed on Oct. 10, 2019.

(51) Int. Cl.
*G06F 30/27* (2020.01)
*G06N 20/20* (2019.01)
(Continued)

(52) U.S. Cl.
CPC ............ *G06F 30/27* (2020.01); *G01M 3/243* (2013.01); *G06F 17/18* (2013.01); *G06N 20/20* (2019.01); *G06F 2113/14* (2020.01)

(58) Field of Classification Search
CPC ...... G06F 30/27; G06F 17/18; G06F 2113/14; G01M 3/243; G01M 3/02; G06N 20/20; G06N 3/045; G06N 3/088; G06N 7/01
See application file for complete search history.

(56) References Cited

U.S. PATENT DOCUMENTS

| 2020/0057965 | A1* | 2/2020 | Howard | G06N 3/08 |
| 2020/0151610 | A1* | 5/2020 | Chueh | G06F 18/211 |
| 2020/0272112 | A1* | 8/2020 | Carullo | G05B 23/0243 |

FOREIGN PATENT DOCUMENTS

| CN | 106015951 A | * 10/2016 | F17D 5/06 |
| CN | 207539636 U | * 6/2018 | |

(Continued)

*Primary Examiner* — Kandasamy Thangavelu
(74) *Attorney, Agent, or Firm* — Locke Lord LLP; CHristopher J. Capelli

(57) ABSTRACT

A computer-implemented method and system for determining placement of a sensor component on a utility pipe. Data relating to the utility pipe is inputted which is processed to generate one or more variables. One or more models are trained, via the one or more variables, to produce an output indicative of a likelihood of failure variable associated with the utility pipe from each model. The outputs from all models are preferably combined into an ensemble output indicative of a likelihood of failure associated with the utility pipe. A consequence of failure variable associated with the utility pipe is determined preferably utilizing a plurality of weighted variables. A sensor placement determinative variable is then determined contingent upon the ensemble output and the consequence of failure variable associated with the utility pipe. Feedback data is then provided indicative of physical placement of one or more sensor components associated with the utility pipe based at least in part on the sensor placement determinative variable.

20 Claims, 5 Drawing Sheets

(51) Int. Cl.
*G01M 3/24* (2006.01)
*G06F 17/18* (2006.01)
*G06F 113/14* (2020.01)

(56) References Cited

FOREIGN PATENT DOCUMENTS

| | | | | | |
|---|---|---|---|---|---|
| CN | 108416478 | A | * | 8/2018 | ............. G06Q 10/04 |
| CN | 109555979 | A | * | 4/2019 | ............... F17D 5/06 |
| CN | 109612529 | A | * | 4/2019 | ............. G01D 21/02 |

* cited by examiner

SYSTEM AND METHOD FOR OPTIMIZING UTILITY PIPE SENSORS PLACEMENT USING ARTIFICIAL INTELLIGENCE TECHNOLOGY

CROSS REFERENCE TO RELATED APPLICATIONS

This application claims priority to U.S. patent application Ser. No. 62/913,671 filed Oct. 10, 2019 which is incorporated herein by reference in its entirety.

FIELD OF THE INVENTION

The disclosed embodiments generally relate to utility pipe leak detection technology, and more particularly to a system and method for probabilistically determining using machine learning techniques the occurrence of leaks in utility pipes for determining leak sensor placement.

BACKGROUND OF THE INVENTION

Drinking water is a scarce resource, yet much of it is lost through pipe failures during its journey to consumers. The World Bank estimates that water leaks cost utilities up to $14 billion per year globally. In the U.S. alone, there are more than 240,000 water leaks per year, a loss of nearly one out of seven gallons of treated water. Compounding the problem is an aging pipe infrastructure, with many pipes reaching the end of their useful life within the next thirty years.

Water pipe leaks range from small and steady to large and catastrophic. Furthermore, some leaks surface above ground causing visible water loss and/or ground changes (e.g. sinkholes) whereas other leaks remain underground and can be hidden for extended periods providing no visible leak indication. The visible leaks are easy to find and are often reported directly by the public, whereas the hidden leaks can remain unknown to the water utilities and may be leaking for an extended period of time. These hidden leaks are often referred to by the water industry as "Non-Revenue Water" (NRW), and represent a significant problem because of lost revenue and the negative environmental impact caused by hidden leaks. It is to be appreciated that NRW levels vary from country to country. However, even in countries with advanced infrastructure, NRW levels can reach significant levels. For instance, the United Kingdom's NRW represents 19% of its total water produced, France 26%, and Italy 29%.

It is noted that prior art techniques have been devised for identifying hidden water leaks. These techniques typically place sensors in various locations within the water network infrastructure of a municipality to collect data which is then processed and analyzed to identify possibly leaks. For example, Echologics LLC has developed a proprietary technology that uses acoustic sensors placed in water hydrants to collect audio signals which are analyzed to identify and locate the sound of leaking water. These methods can have acceptable accuracy, however they are expensive and infeasible to deploy across a complete water pipe infrastructure. As a consequence, water utilities selectively pick only a few locations within their network to monitor using these sensor-based technologies.

There is thus a need to determine optimal locations for deploying leak sensors for detecting hidden leaks. Often picking these locations is subjective and based on the opinion of human experts, which is expensive and often non-effective for determining optimal locations for positioning leak sensors.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

In furtherance of the illustrated embodiments discussed herein, it is to be appreciated and understood Artificial Intelligence (AI) may be used to support decision making determinations associated with water pipe leaks by providing processes which calculate the probability of any water pipe failing that occurs in a future time period. Thus, and in accordance with the below described illustrated embodiments, various sensors may be deployed strategically to monitor and examine water pipes that represent a highest Risk within the water infrastructure, where Risk is to be understood to be defined as a function of Likelihood of Failure (LoF) and Consequence of Failure (CoF) associated with the water pipe. This Risk assumption is predicated upon that pipes with high LoF may have already failed causing a leak that hasn't surfaced yet but can be detected by the appropriate equipment, or they will fail soon and thus need to be monitored closely.

To achieve these and other advantages and in accordance with the purpose of the illustrated embodiments, in one aspect, a computer-implemented method and system for determining placement of a sensor component on a utility pipe is described in which at one or more computing devices, data relating to the utility pipe is inputted. The inputted data is then processed to generate one or more variables. The one or more computer devices, via the one or more variables, preferably trains one or more models to produce an output indicative of a likelihood of failure variable associated with the utility pipe from each model. The outputs from all models are preferably combined into an ensemble output indicative of a likelihood of failure associated with the utility pipe. A consequence of failure variable associated with the utility pipe is determined preferably utilizing a plurality of weighted variables. A sensor placement determinative variable is then calculated contingent upon the ensemble output and the consequence of failure variable associated with the utility pipe. Feedback data is then provided indicative of physical placement of one or more sensor components associated with the utility pipe based at least in part on the sensor placement determinative variable.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
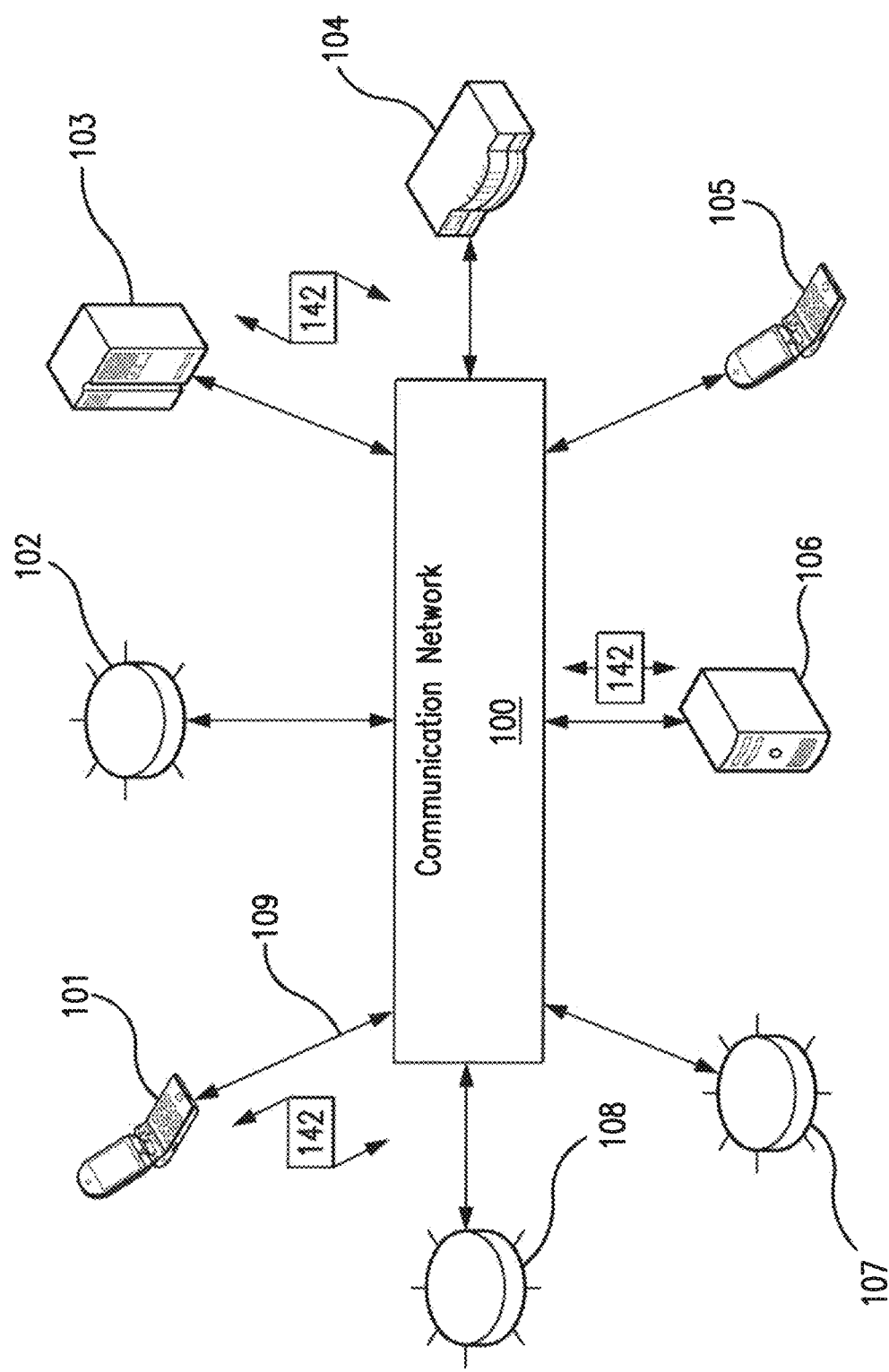
FIG. 1 illustrates an exemplary system overview and data-flow for use with an illustrated embodiment for depicting system operation.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, workstations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/user devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the illustrated embodiments may be embodied as a system, method or computer program product. Accordingly, aspects of the illustrated embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the illustrated embodiments may take the form of a computer program product embodied in one or more computer readable medium(s) having computer readable program code embodied thereon.

Any combination of one or more computer readable medium(s) may be utilized. The computer readable medium may be a computer readable signal medium (e.g., such as an "app" downloadable from an app store (e.g., iTunes™)) or a computer readable storage medium. A computer readable storage medium may be, for example, but not limited to, an electronic, magnetic, optical, electromagnetic, infrared, or semiconductor system, apparatus, or device, cloud service or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, an or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrated embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrated embodiments are described below with reference to flowchart illustrations and/or block diagrams of methods, apparatus (systems) and computer program products according to embodiments of the illustrated embodiments. It will be understood that each block of the flowchart illustrations and/or block diagrams, and combinations of blocks in the flowchart illustrations and/or block diagrams, can be implemented by computer program instructions. These computer program instructions may be provided to a processor of a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
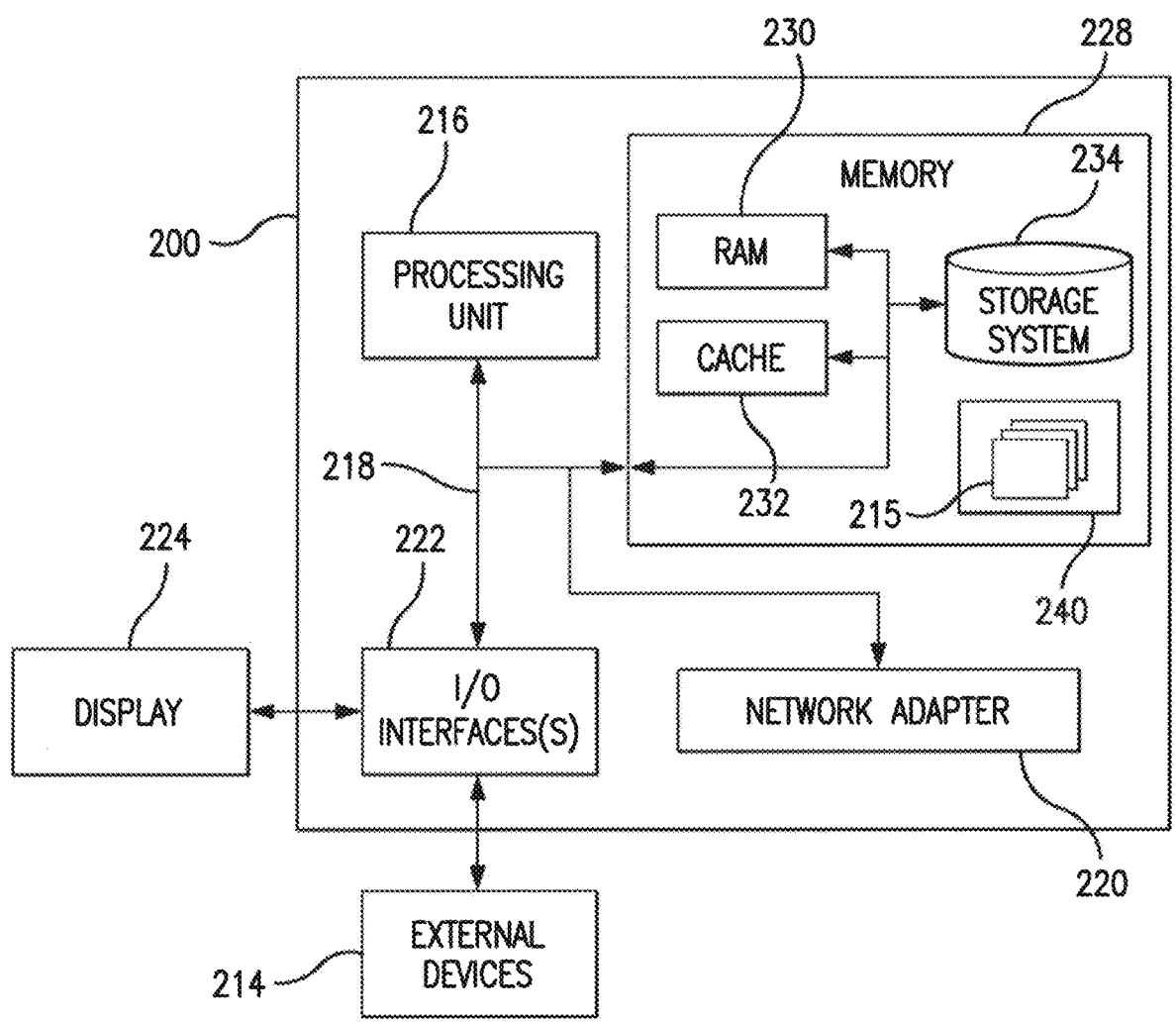
FIG. 2 illustrates an example user computing device configured in accordance with the illustrated embodiments.

With reference now to FIG. 2, shown is a schematic block diagram of an example network user computing device 200 (e.g., a smart phone 105, etc.) that may be used (or components thereof) with one or more illustrated embodiments described herein. As explained above, in different embodiments these various devices are configured to communicate with each other in any suitable way, such as, for example, via communication network 100.

Device 200 is intended to represent any type of user computer system capable of carrying out the teachings of various embodiments of the illustrated embodiments. Device 200 is only one example of a suitable system and is not intended to suggest any limitation as to the scope of use or functionality of embodiments of the illustrated embodiments described herein. Regardless, user device 200 is capable of being implemented and/or performing any of the functionality set forth herein.

User device 200 is operational with numerous other general purpose or special purpose computing system environments or configurations. Examples of well-known computing systems, environments, and/or configurations that may be suitable for use with computing device 200 include, but are not limited to, tablet devices and preferably other portable user computing devices (e.g., hand-held or laptop devices) that include any of the above systems or devices, and the like.

User device 200 may be described in the general context of computer system-executable instructions, such as program modules, being executed by a computer system. Generally, program modules may include routines, programs, objects, components, logic, data structures, and so on that perform particular tasks or implement particular abstract data types. User device 200 may be practiced in distributed data processing environments where tasks are performed by remote processing devices that are linked through a communications network. In a distributed data processing environment, program modules may be located in both local and remote computer system storage media including memory storage devices.

User device 200 is shown in FIG. 2 in the form of a user computing device. The components of device 200 may include, but are not limited to, one or more processors or processing units 216, a system memory 228, and a bus 218 that couples various system components including system memory 228 to processor 216 and one or more camera components.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

User device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the illustrated embodiments as described herein.

Device 200 may also communicate with one or more external devices 214 such as a keyboard, a pointing device, one or more camera components, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as cellular networks (e.g., TDMA, CDMA, 4 g and 5 g); a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described illustrated embodiments may be implemented. FIGS. 1 and 2 are exemplary of a suitable environment and are not intended to suggest any limitation as to the structure, scope of use, or functionality of an embodiment of the illustrated embodiments. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and user device 200 (FIG. 2) being generally shown and discussed above, description of certain illustrated embodiments of the present invention will now be provided. As will be further appreciated from the below discussion of the certain illustrated embodiments, pipe-related data is accessed preferably from a water utility (e.g. pipe age, material, size, pressure, volume, leak/break history, etc.) and is preferably combined with publicly accessible data regarding environmental conditions the pipe is subjected to (e.g. temperature changes, rainfall, soil moisture and type, seismic activity, elevation, traffic flow, etc.) to derive determinative probabilistic data regarding sensor placement for a subject water utility pipe. Preferably, machine learning algorithms are utilized for detecting and learning patterns that preceded previous pipe breaks to generate a probability score (e.g., Likelihood of Failure (LoF)) for each utility pipe failing in a future time period (e.g., days, weeks, months, years). The LoF score for every pipe is preferably combined with its determined Consequence of Failure (CoF) score (which may preferably be a function of replacement costs, environmental impact, affected population size, potential traffic disruptions, etc) to determine a final risk metric value. Contingent upon the determined risk metric value, hardware sensors may then be positioned in optimum locations based on the distribution of risk scores within the pipe network.

It is to be appreciated that the subject invention is applicable to determining leaks in utility pipes, and for ease of description, discussion is provided with regards to a water utility pipe. However, the illustrated embodiments are not to be understood to be limited to water utility pipe application as other fluid and gas carrying water pipes and systems are to be understood to be encompassed by the illustrated embodiments.

In accordance with the illustrated embodiments, data relating to a utility pipe, such as a water pipe, is accessed and preferably cleansed from a utility company regarding their pipes and breaks. This obtained data typically includes information regarding pipe networks, such as topology of the water pipes, installation year for each pipe, material, diameter, length, etc. In addition, utility companies may also provide known pipe break history including dates for certain pipe breaks, location, cause of break (if known), etc. However, it is known that such accessed data often contains errors and omissions attributable to various reasons, such as: errors introduced when legacy paper records were converted to digital format, data entry errors, crews that repair pipe breaks recorded erroneous location of breaks, and the like. To obviate these occurrences, statistical techniques are utilized in the illustrated embodiments to correct such errors. For instance, outliers are detected and replaced by statistically valid values, or may be removed from a dataset.

Additionally, publicly available data related to the geographic location of the pipe network is collected, which may include for instance soil data obtained from the USGS databases, weather data obtained from NOAA, population density obtained from the Census Bureau relating to the environment and/or geography associated with a subject water pipe. This public data is then preferably combined with the aforesaid data accessed from a utility company to enrich a dataset regarding a subject water pipe. For instance, accumulated data relating to a subject water pipe record may include the type of soil it is surrounded by, the population size it serves, and the weather conditions present during prior breaks. It is to be appreciated this accumulated data is beneficial during a machine learning phase when a model is trained to identify the conditions under which a water pipe is most likely to leak or break.

It is to be appreciated that the aforesaid obtained data variables are combined to create new data variables utilized to calculate a probability of failure for a water pipe. For example, a created data variable may combine geometric features of a pipe with population density and soil data the water pipe is associated with. These created data variables may also include data transformations enabling the water pipe data to be better suited for particular machine learning algorithms. For instance, a linear regression algorithm works well when independent variables have linear relationships with the dependent variables, whereby if the actual relationship of a variable is exponential, then a new variable may be created using the logarithmic function, such that the resulting relationship can be transformed to linear.

Once the aforesaid data preparation is completed, the resulting dataset is preferably utilized to train several machine learning models representing various algorithms, such as: Logistic Regression; Support Vector Machines; Neural Networks; Bayesian Networks and the like. It is to be understood that each machine learning model produces a different set of outputs. Hence, in order to obtain an optimal result, the different outputs from the models are preferably combined through an Ensemble technique, such as voting or a weight-combination. The output of the Ensemble technique is a Likelihood of Failure (LoF) probability for every pipe in the system of a utility company that data was provided for.

A Consequence of Failure (CoF) variable is then calculated for each such pipe in the pipe network. It is to be appreciated the calculation of CoF variables is contingent upon various factors related to the consequences of failure of a certain pipe, such as cost of pipe repair, cost of pipe replacement, potential environmental damage, size of affected population, important facilities such as hospitals or schools serviced by the pipe, potential traffic disruptions caused by failure of the pipe and the like. A numeric score is assigned to each one of these factors associated with the pipe, and these individual scores are combined with each other, preferably using weighted values, to determine a final CoF metric. The overall Risk metric for a water pipe is calculated as a function of LoF and CoF, such as (but not to be limited to): Risk=LoF*CoF.

Based on the aforesaid calculated Risk metric for each water pipe in the pipe network, optimal locations for placing pipe leak sensors are then calculated. An exemplary algorithm for calculating such locations is contingent on the type and number of leak sensors, as well as being contingent upon any restrictions associated with their use. For instance, if the sensors are acoustic and require attachment to water hydrants, then the location of the hydrants is necessary for the calculations of optimal sensor placements. That is, each hydrant may be assigned a score based on the cumulative Risk of the water pipes that can be monitored through that hydrant, and thus the hydrants with the highest score are preferably given priority for sensor placement. Thus, the potential locations for placing sensors are ranked and sorted by their determined probabilistic effectiveness in catching the most likely and most catastrophic water leaks.

Figure 3:
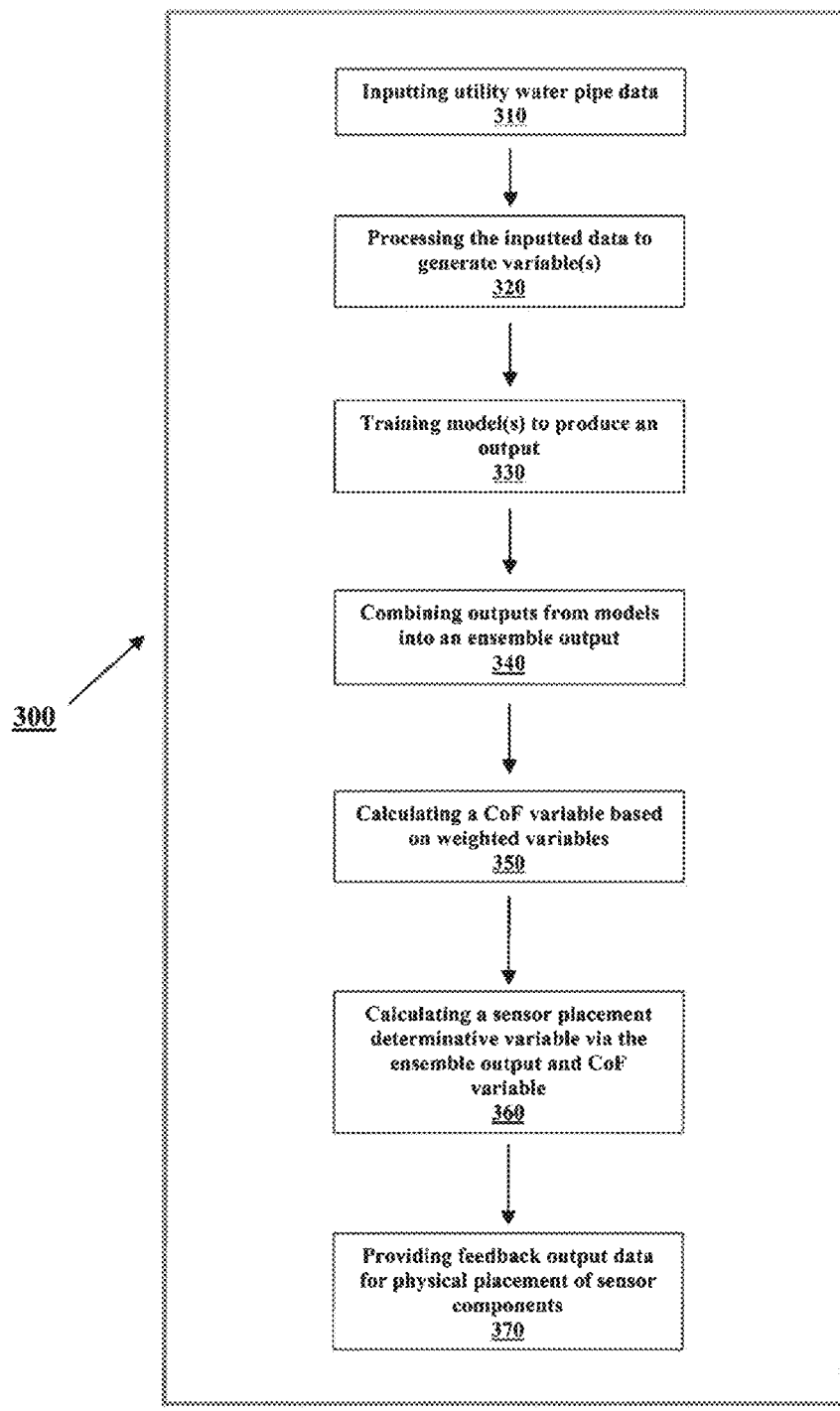
FIGS. 3-5 illustrate flow processes in accordance with the illustrated embodiments.
Figure 4:
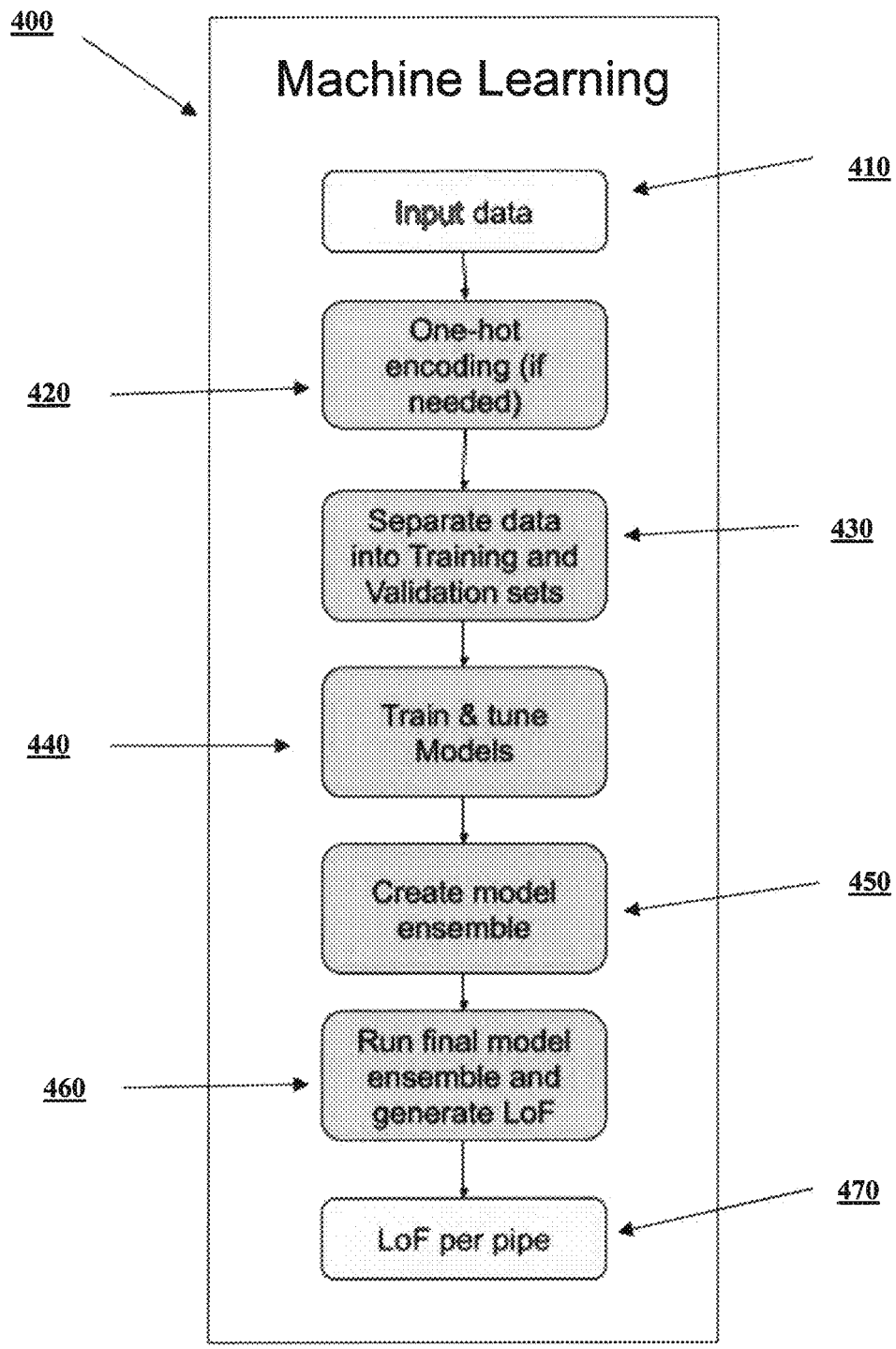
Figure 5:
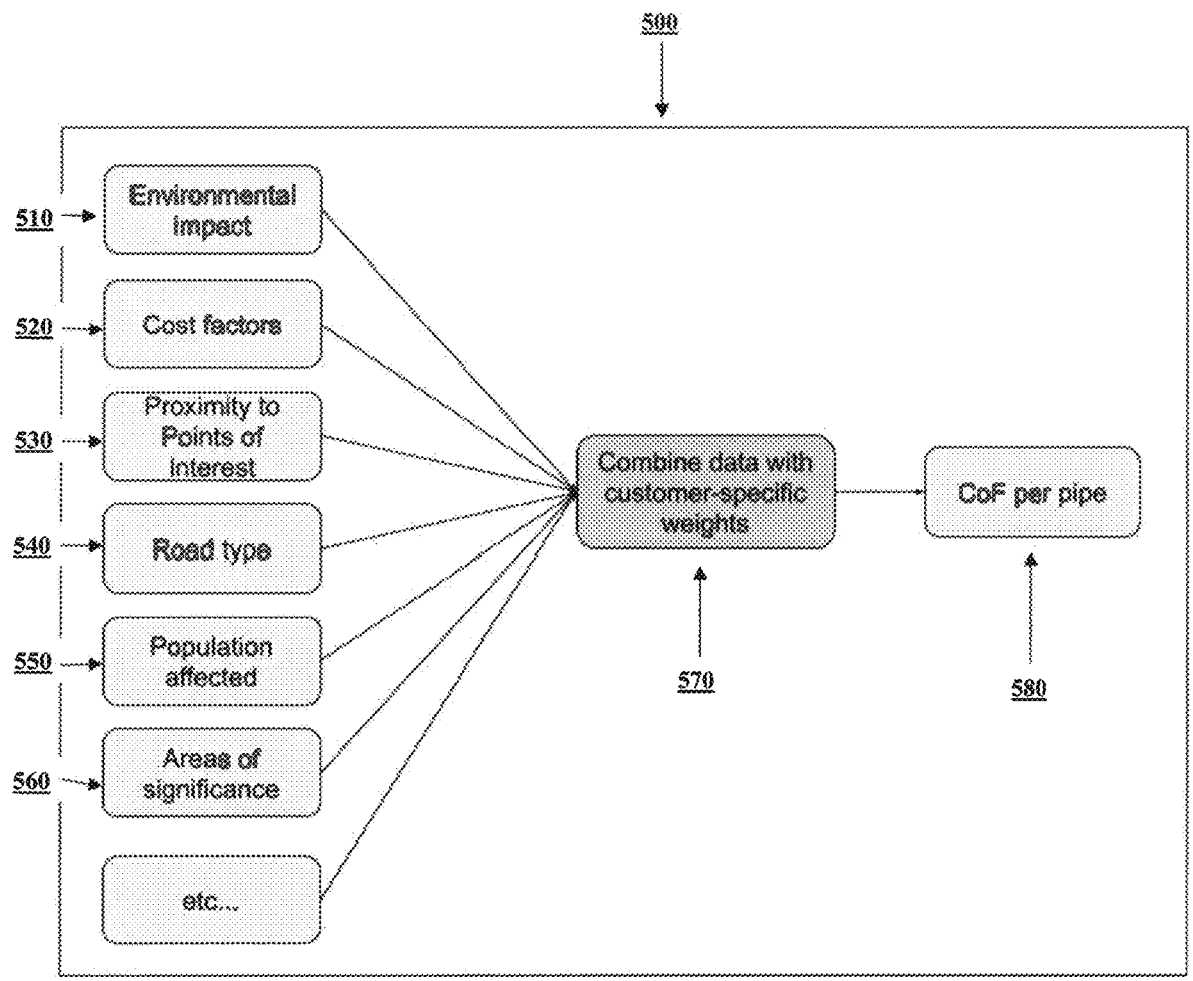

With particular reference now to FIGS. 3-5 of the certain illustrated embodiments, and commencing at process 300 of FIG. 3, starting at step 310, data is inputted into the one or more computer devices 200, which preferably includes data provided by (and/or electronically accessed from) utility companies preferably including information associated with their respective pipe networks. For instance, such accessed/provided data may consist of (but is not to be limited to) the topology associated with a utility pipe, installation year for each utility pipe, material of each utility pipe, diameter of each utility pipe, length of each utility pipe and other data regarding certain parameters of utility pipes provided and/or serviced by the subject utility company. Data inputted at step 310 may also include information regarding known break history for each utility pipe break. In accordance with the illustrated embodiments, the data inputted at step 310 may be subjected to performance of statistical cleansing techniques by the one or more computer devices 200 for correcting errors and omissions detected in the inputted data (e.g., conversion errors and data entry errors, as noted above). Additionally in accordance with the illustrated embodiments, the data inputted at step 310 may be further subjected to normalizing detected errors in the data by detecting outliers which may be replaced with statistically valid values, or the detected outliers be entirely removed from the data.

It is to further understood that the data inputted at step 310 may further include data provided by, or accessed from, public sources regarding geographic public data associated with subject utility pipes, which for example, may include soil data obtained from the USGS databases, weather data obtained from NOAA, and population density obtained from the Census Bureau. Additional examples of geographic public provided/accessed data in step 310 may include utility pipe records, soil type surrounding utility pipes, size of the population serviced by the utility pipe, and weather conditions during prior utility pipe breaks. Additionally, the data inputted at step 310 may also consist of a combination of geographic public data combined with existing utility pipe data for enriching the aggregated inputted dataset which consequently preferably enhances performance of process 300 in the one or more devices 200.

Next, at step 320, the inputted data (step 310) is processed to generate one or more variables at the one or more computer devices 200. Preferably, this processing includes combining inputted data 310 to create proprietary variables that can be useful in calculating a likelihood of failure (LoF) for each utility pipe. Processing 320 the inputted data 310 may also include generating data transformations for use in training of the one or more models and/or executing the calculation of the LoF variable for each utility pipe. For instance, the LoF variable of a subject utility pipe is preferably generated based upon the combination of geometric features of a utility pipe with geographic population density and soil data obtained from the inputted data of step 310. For instance, in the processing by the one or more devices 200 of step 320, the aforesaid data transformations are generated using one or more of (and is not to be understood to be limited to): linear regression algorithms, statistical error-correcting, statistical data filling techniques, and data augmentation methods such as Synthetic Minority Over-Sampling Techniques (SMOTE) or Generative Adversarial Networks (GANs) for optimizing the inputted data (step 310) for accommodation by individual machine-learning methods. For example, in step 320, a linear regression algorithm may perform well when an independent variable has linear relationships with a dependent variable such that if the actual relationship of a variable is exponential, a new variable is then created using the logarithmic function such that that the resulting relationship is transformed to linear.

Proceeding the step 330 of process 300, the aforementioned training of the one or more models preferably produces an output indicative of a LoF variable associated with the subject utility pipe from each model at the one or more computer devices 200, via the one or more variables. It is to be understood a resulting dataset is produced from the inputted data (step 310) and training process (step 330). During the training process 400 (step 330), as detailed in FIG. 4, the process 400 begins with the input of data from the resulting data set (step 410), which is then preferably subjected to one-hot encoding (step 420). It is to be appreciated the input data (step 410) may be separated into training and validation sets (step 430), which is preferably utilized in training and tuning models (step 440) during the training process (step 330), or during another process stage. For instance, examples of training (step 330) on the one or more models to produce one or more individual outputs during process 400 may include utilizing Machine Learning techniques, such as (but not to be understood to be limited to): Supervised Learning, Unsupervised Learning, Transfer Learning, Reinforcement Learning, Clustering, Classification, Dimensionality Reduction, Ensemble Methods, and/or Deep Learning. It is to be understood the training (step 330) of the one or more models may include the one or more models each producing an individual output.

Proceeding to step 340 of process 300, the outputs from the models are utilized to preferably produce an ensemble output indicative of a LoF variable associated with a subject utility pipe. With reference to FIG. 4, in step 450 combining the outputs (step 340) preferably includes creating an ensemble output, which is then executes (step 460) to generate an ensemble output as a collective LoF variable per utility pipe (step 470). For example, combining the outputs (step 340) from the models may preferably occur through an ensemble technique, such as voting or a weight-combination. The result of combining the outputs 340 may be the generation of a LoF variable for every utility pipe in a utility pipe network.

Proceeding now to step 350 of process 300, a Consequence of Failure (CoF) variable is now calculated that is associated with the subject utility pipe. In accordance with the illustrated embodiments, the CoF variable is calculated preferably utilizing a plurality of weighted variables at the one or more computer devices 200. It is to be understood that calculating the CoF variable (step 350) may also be calculated in regard to each subject utility pipe in a utility pipe network for which data is accessed/provided (step 310). With reference to process 500 of FIG. 5, the calculation of the CoF variable occurs via process 500, which preferably is contingent upon weighted variables related to the CoF variable. For instance, examples of such weighted variables may include environmental impact 510, cost factors 520, proximity to points of interest 530, road type 540, population affected 550, and areas of significance 560, each being associated with the subject utility pipe(s). In step 570 of process 500 performed by the one or more devices 200, a numeric score is preferably assigned to each one of these weighted variables, which variables are then combined with each other through a customer-specific set of weights to result in calculating a CoF variable (step 350, FIG. 3 and step 580, FIG. 5).

In accordance with the illustrated embodiments, at step 360 of process 300 a sensor placement determinative variable is determined by the one or more devices 200, preferably via the ensemble output (LoF variable) (step 470) and the determined CoF variable (step 580) each associated with a subject utility pipe. It is to be appreciated the calculated sensor placement determinative variable (step 360) is preferably generated as a function of the LoF variable (step 470) and the CoF variable (step 580), which in one illustrated embodiment may be calculated by the equation:

$$\text{sensor placement determinative variable} = \text{LoF variable} * \text{CoF variable}$$

However, it is to be understood and appreciated that the illustrated embodiments may encompass other calculation methodologies for determining a sensor placement determinative variable (step 360).

Next, at step 370 of process 300, the one or more devices 200 are configured to provide feedback output data that is indicative of physical placement of one or more sensor components associated with the subject utility pipe based at least in part on the aforesaid sensor placement determinative variable (step 360). It is to be understood that providing feedback output data (step 370) preferably indicates an optimum location for placing one or more sensor components for detecting leaks/breaks associated with the subject utility pipe. It is to be further understood that providing feedback output data (step 370) may be contingent upon a specific geographic location of the subject utility pipe, and may further depend on the type and number of the one or more sensor components to be associated with the subject utility pipe, which may include restrictions associated with their deployment or usage. For instance, if the one or more sensor components associated with the subject utility pipe are acoustic and are required to be attached to associated water hydrants, then the location of the hydrants may be necessary for the calculation of the optimum sensor physical placements as part of providing feedback output data (step 370) based at least in part on the sensor placement determinative variable (step 360). For example, a certain hydrant may be assigned a score value dependent upon the cumulative weight of the sensor placement determinative variable (step 360) regarding the utility pipes which may be monitored through that specific hydrant, via the feedback output data (step 370). Therefore, the hydrants with the most favorable score may be given priority for the placement of the one or more sensor components. It is thus to be appreciated that by providing this feedback output data (step 370), the ranking of potential locations for the placement of the one or more sensor components is generated, which may preferably be sorted by their effectiveness in detecting likely and catastrophic leaks associated with the subject utility pipe.

With certain illustrated embodiments described above, it is to be appreciated that various non-limiting embodiments described herein may be used separately, combined or selectively combined for specific applications. For instance, the one or more user devices 200 may be configured to enable a policyholder user to record one or more personal property losses associated with the structure. Further, some of the various features of the above non-limiting embodiments may be used without the corresponding use of other described features. The foregoing description should therefore be considered as merely illustrative of the principles, teachings and exemplary embodiments of this invention, and not in limitation thereof. For instance, the attached Appendix contains further illustrative features of the illustrated embodiments.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer-implemented method for determining placement of one or more sensor components on a utility pipe, comprising:
    inputting, at one or more computer devices, data relating to the utility pipe;
    processing, at the one or more computer devices, the inputted data to generate one or more variables;
    training, at the one or more computer devices via the one or more variables, one or more models each to produce an output indicative of a likelihood of failure variable associated with the utility pipe from each model;
    combining the outputs from all models into an ensemble output indicative of a likelihood of failure associated with the utility pipe;
    calculating, at the one or more computer devices, a consequence of failure variable associated with the utility pipe utilizing a plurality of weighted variables;
    calculating, at the one or more computer devices via the ensemble output and the consequence of failure variable associated with the utility pipe, a sensor placement determinative variable; and providing feedback, from the one or more computer devices, output data indicative of physical placement of one or more sensor components associated with the utility pipe based at least in part on the sensor placement determinative variable.

2. The computer-implemented method of claim 1, wherein the inputted data includes information accessed from a utility company associated with the utility pipe.

3. The computer-implemented method of claim 1, wherein the inputted data includes geographic environmental data associated with a geographic environment the utility pipe is exposed to.

4. The computer-implemented method of claim 1, further including, detecting, in the one or more computer devices, errors and omissions in the inputted data and correcting the detected errors and omissions in the inputted data using computer-implemented statistical techniques.

5. The computer-implemented method of claim 1, wherein processing the inputted data further includes generating data transformations for use in training of the one or more models or executing the calculation of the likelihood of failure variable.

6. The computer-implemented method of claim 5, wherein the data transformations are generated using linear regression algorithms, statistical error-correcting, statistical data filling techniques, and data augmentation methods such as Synthetic Minority Over-Sampling Techniques (SMOTE) or Generative Adversarial Networks (GANs) for optimizing the inputted data for individual machine-learning methods.

7. The computer-implemented method of claim 1, wherein training the one or more models includes the one or more models each producing an individual output.

8. The computer-implemented method as recited in claim 7, wherein training the one or more models to produce one or more individual outputs includes utilizing at least one Machine Learning technology such as Supervised Learning, Unsupervised Learning, Transfer Learning, Reinforcement Learning, Clustering, Classification, Dimensionality Reduction, Ensemble Methods, or Deep Learning.

9. The computer-implemented method of claim 1, wherein the ensemble output is defined as a collective likelihood of failure variable.

10. The computer-implemented method of claim 1, wherein the utility pipe is a water pipe.

11. A computer system for determining placement of one or more sensor components on a utility pipe, comprising:
a memory configured to store instructions;
a processor disposed in communication with said memory, wherein said processor upon execution of the instructions is configured to:
input data relating to the utility pipe;
detect errors and omissions in the input data and correct the detected errors and omissions in the input data using computer-implemented statistical techniques;
process the inputted data to generate one or more variables;
train, via the one or more variables, one or more models to produce an output indicative of a likelihood of failure variable associated with the utility pipe;
combine the outputs from all models into an ensemble output indicative of a likelihood of failure associated with the utility pipe;
calculate a consequence of failure variable associated with the utility pipe utilizing a plurality of weighted variables;
calculate, via the ensemble output and the consequence of failure variable associated with the utility pipe, a sensor placement determinative variable; and
provide feedback, from the computer system, output data indicative of physical placement of one or more sensor components associated with the utility pipe based at least in part on the sensor placement determinative variable.

12. The computer system as recited in claim 11, wherein the inputted data includes information accessed from a utility company associated with the utility pipe and geographic environmental data associated with a geographic environment the utility pipe is exposed to.

13. The computer system of claim 11, wherein processing the input data further includes generating data transformations for use in training of the one or more models and executing the calculation of the likelihood of failure variable.

14. The computer system of claim 13, wherein the data transformations are generated using linear regression algorithms, statistical error-correcting, statistical data filling techniques, and data augmentation methods such as Synthetic Minority Over-Sampling Techniques (SMOTE) or Generative Adversarial Networks (GANs) for optimizing the inputted data for individual machine-learning methods.

15. The computer system as recited in claim 11, wherein training the one or more models includes the one or more models each producing an individual output.

16. The computer system as recited in claim 15, wherein training the one or more models to produce one or more individual outputs includes utilizing at least one Machine Learning technology such as Supervised Learning, Unsupervised Learning, Transfer Learning, Reinforcement Learning, Clustering, Classification, Dimensionality Reduction, Ensemble Methods, or Deep Learning.

17. The computer system as recited claim 11, wherein the ensemble output is defined as a collective likelihood of failure variable.

18. The computer system as recited in claim 11, wherein the utility pipe is a water pipe.

19. A non-transitory computer readable storage medium and one or more computer programs embedded therein, the computer programs comprising instructions, which when executed by a computer system, cause the computer system to:
input data relating to a utility pipe including information accessed from a utility company associated with the utility pipe and geographic environmental data associated with a geographic environment the utility pipe is exposed to;
detect errors and omissions in the input data and correct the detected errors and omissions in the input data using computer-implemented statistical techniques;
process the inputted data to generate one or more variables and generate data transformations for use in training of the one or more models wherein the data transformations are generated optimizing the inputted data for individual machine-learning methods;
train, via the one or more variables, one or more models to produce an output indicative of a likelihood of failure variable associated with the utility pipe;
combine the outputs from all models into an ensemble output indicative of a likelihood of failure associated with the utility pipe; calculate a consequence of failure variable associated with the utility pipe utilizing a plurality of user weighted variables;

calculate, via the ensemble output and the consequence of failure variable associated with the utility pipe, a sensor placement determinative variable; and provide feedback, from the computer system, output data indicative of physical placement of one or more sensor components associated with the utility pipe based at least in part on the sensor placement determinative variable.

20. The non-transitory computer readable storage medium, as recited in claim 19, wherein training the one or more models includes the one or more models each producing an individual output and wherein training the one or more models to produce one or more individual outputs includes utilizing at least one Machine Learning technology such as Supervised Learning, Unsupervised Learning, Transfer Learning, Reinforcement Learning, Clustering, Classification, Dimensionality Reduction, Ensemble Methods, or Deep Learning.

\* \* \* \* \*